United States Patent

[11] 3,588,338

[72] Inventors Robert A. Dischert
Burlington;
Laurence Joseph Thorpe, Marlton, N.J.

[21] Appl. No. 809,230

[22] Filed Mar. 21, 1969

[45] Patented June 28, 1971

[73] Assignee RCA Corporation

[54] GAMMA CORRECTION AND SHADING MODULATION CIRCUITRY FOR A TELEVISION CAMERA

18 Claims, 4 Drawing Figs.

[52] U.S. Cl. 178/7.1, 178/Dig. 16

[51] Int. Cl. H04n 5/20, H04n 5/21

[50] Field of Search 178/6 (gamma), 7.1 (D.C.), 7.1, 7.2 (b)

[56] References Cited

UNITED STATES PATENTS

| | | | |
|---|---|---|---|
| 2,292,817 | 8/1942 | Bedford | 178/7.2 |
| 2,338,646 | 1/1944 | Kessler | 178/7.2 |
| 2,658,104 | 11/1953 | Smith | 178/7.2 |
| 3,341,654 | 9/1967 | Pay et al. | 178/7.1 |

*Primary Examiner*—Robert L. Richardson
*Attorney*—Eugene M. Whitacre

ABSTRACT: In a television camera apparatus is provided for adding gamma correction and shading modulation correction and varying the pedestal height of video signals. One circuit combines the functions of gamma correction and shading modulation correction. Another circuit combines the functions of gamma correction and pedestal or black level control while maintaining the white level of the signals constant.

INVENTORS
ROBERT A. DISCHERT &
LAURENCE J. THORPE
BY Eugene M. Whitacre
ATTORNEY

INVENTORS
ROBERT A. DISCHERT &
LAURENCE J. THORPE

BY [signature]
ATTORNEY

GAMMA CORRECTION AND SHADING MODULATION CIRCUITRY FOR A TELEVISION CAMERA

BACKGROUND OF THE INVENTION

This invention relates to video processing circuits in a television camera, and more particularly to apparatus for providing gamma correction, shading modulation correction and/or black level control of video signals.

In a television system it is necessary to process the video signals before transmission to compensate for certain nonlinearities in the respective transmission and receiving systems to ensure that the viewer sees a picture which is a true reproduction of the televised scene. Among the nonlinearities of the system for which compensation must be made are the gamma characteristics of the television receiver picture tube and the shading modulation produced by the television camera pickup tube.

Gamma, as related to a television image, is defined as a numerical indication of the degree of contrast in a television image. Gamma correction of the video signal is necessary to insure that the transmitted television signal will be properly reproduced by a television receiver. Kinescopes used in television receivers generally have a nonlinear characteristic such that the black portions of a video signal are compressed and the white portions of a video signal are stretched. The black to white range, or gray scale, of a monochrome television signal or the luminance portion of a color television signal is represented by amplitude variations of the video signals. Therefore a video signal varying linearly in amplitude applied to a nonlinear kinescope in a television receiver would result in a picture the contrast range of which would be reduced undesirably according to the nonlinear transfer characteristic of the kinescope. Accordingly, it is desirable to gamma correct the video signal prior to transmission in such a manner that the signal reproduced in a television receiver has the desired contrast range. Generally, gamma correction is accomplished by passing the video signals derived from the television camera through a nonlinear circuit having a predetermined exponential relationship between input and output to precorrect the signal for the subsequent nonlinear transfer characteristic of the kinescope in the television receiver. While the exponent may be any selected number, it is generally accepted that the nonlinear circuit should provide an output equal to its input raised to the one-half power. The nonlinear circuit providing gamma correction of video signals is usually located in a video signal processing amplifier coupled between the camera pickup tube and the color coder, where the video signals are combined with a subcarrier prior to transmission.

Shading modulation is an amplitude variation of the video signal arising from nonuniformities in the television camera optics system or in the camera pickup tube as it is scanned by an electron beam. Shading modulation, for example, may have the effect of decreasing the amplitude of the video signals derived as the edges of a rectangular raster of a camera pickup tube are scanned by an electron beam.

Shading adversely affects both monochrome and color television signals. In the case of a color television camera utilizing three image pickup tubes to produce red, blue and green color representative signals it may be necessary to employ shading correction with all three pickup tubes so that the color signals and the luminance signals derived from matrixing of the color signals are uniformly representative of the color and brightness of all areas of the televised scene. It is known that shading generators may produce shading correction waveforms of correct amplitude and polarity by combining sawtooth and parabolic waveforms at the line and field scanning rates. The correction waveforms are combined with the video signals to produce corrected video signals.

Heretofore, it has been customary to apply shading correction and gamma correction separately to the video signals. For example, clamped video signals are coupled to a shading modulator to which shading correction waveforms from a shading generator are also coupled. The shading corrected video signals are then coupled to a gamma correction circuit which may include several diodes biased at successively higher fixed potentials such that the shading corrected video signals are gamma corrected according to the characteristics of the nonlinear diode circuitry. The shading corrected and gamma corrected video signals are then coupled to further processing circuits in the camera chain prior to transmission.

Frequently it is necessary to adjust the black level of the video signals in order to compensate for the variations of this level which occur in signals from different sources. For example, absent any correction or adjustment, a color television film camera will produce a different electrical signal representative of image black level as different films are projected onto the camera pickup tubes. These black level signal variations are encountered since the film density for the black portion of an image and, therefore, the light transmission for such a black image portion can be expected to differ from one film to another. Uncorrected video signals produced from different films or other image sources thus may be expected to include different pedestal components (i.e., the difference between the video signal level representing black areas of the image and a reference or blanking signal level). It is desirable to provide means for adjusting the black signal level with respect to the reference blanking level while maintaining the peak or white level of the video signal in predetermined relation to the reference level. Such a means may be referred to as a pedestal/gain control circuit.

In the past, one approach to pedestal adjustment has been to adjust the black level of the video signals in one stage, apply gamma correction to the signals after black level setting, and feed back a portion of the gamma corrected signals to a gain controlled stage preceding the black level stage through a "white pulse" circuit in order to keep the white level constant. That approach requires extensive circuitry as is shown and described, for example, in U.S. Pat. No. 3,368,033, granted Feb. 6, 1968, to R. A. Dischert and Norman P. Kellaway and assigned to the same assignee as the present invention.

It is an object of the invention to provide apparatus for combining the functions of shading and gamma correction of video signals, and to provide simple apparatus for varying the pedestal height without varying the white level peaks of the video signals, thereby reducing the complexity and cost of processing circuitry in a television camera.

According to the invention apparatus is provided for combining processing functions in a television camera. A source of video signals is coupled to a nonlinear network including a plurality of conducting devices. Means including a source of control signals are coupled to the nonlinear network for altering conduction of the devices such that the video signals obtained from the nonlinear network are both gamma corrected and further altered in accordance with the control signals.

In one embodiment apparatus is provided for combining the functions of shading modulation correction and gamma correction of video signals in a television camera. A source of video signals is coupled to a nonlinear network including a plurality of unidirectional conducting means. Shading correction waveforms at line and field scanning rates are coupled to means including a biasing circuit. The biasing circuit is coupled to the nonlinear network whereby the conduction of the unidirectional conducting means is determined by the biasing circuit and the shading correction waveforms for simultaneously effecting the shading correction and gamma correction of the video signals.

In another embodiment apparatus is provided for gamma correcting the video signals and for controlling the pedestal height while maintaining the peak white signal level constant. A source of video signals is coupled to means including a nonlinear network for gamma correcting the video signals. Means are coupled to the nonlinear network for altering its characteristics in accordance with a control signal, the magnitude of the control signal determining the pedestal height of the video signals obtained from the means including the nonlinear network without affecting the peak white portions of the video signals.

A detailed description of two embodiments of the invention is given in the following specification and accompanying drawings of which:

DETAILED DESCRIPTION OF THE INVENTION

Figures 1, 2:
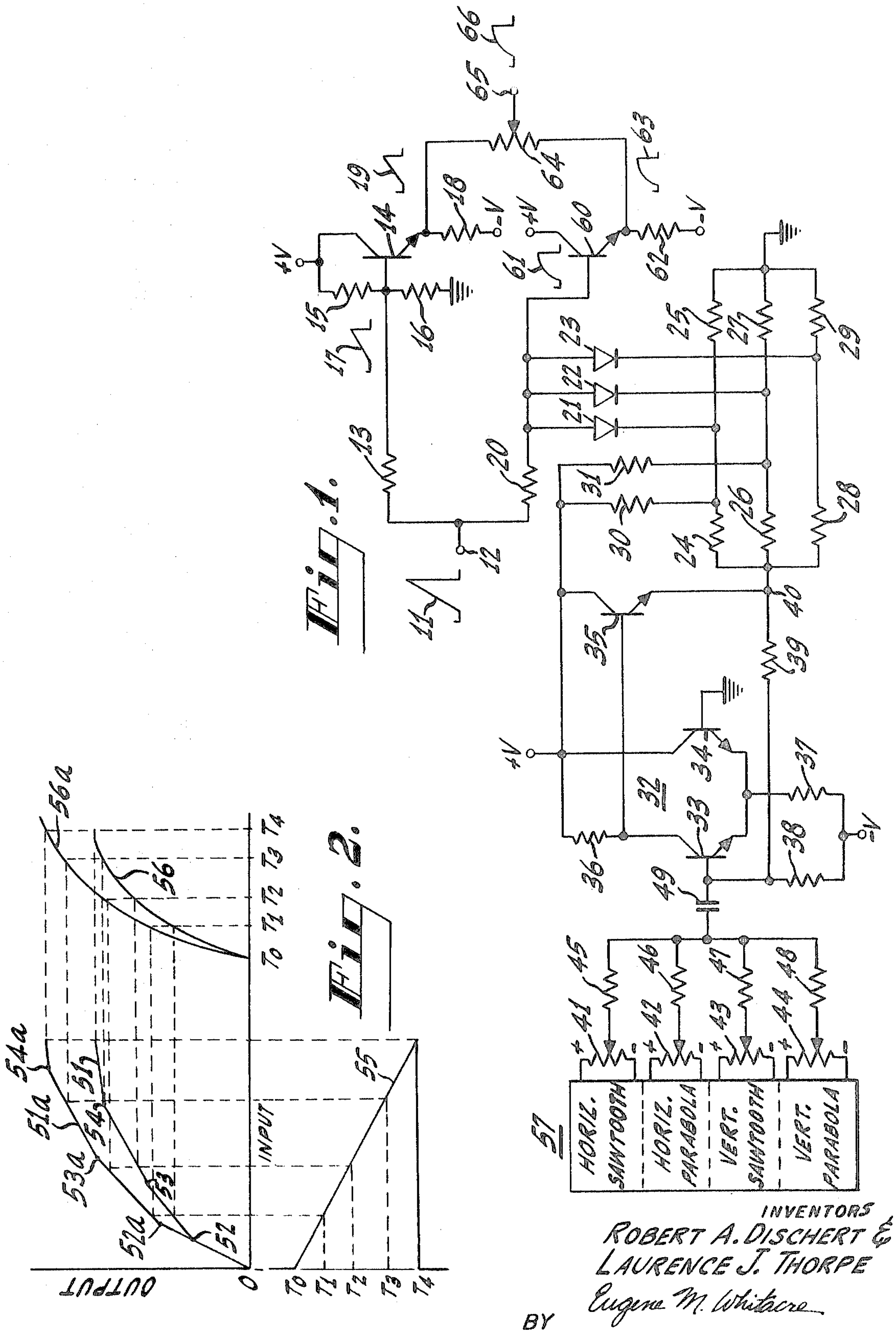
FIG. 1 is a schematic diagram of a combined shading and gamma correction circuit according to the invention.
FIG. 2 illustrates typical characteristic curves and waveforms of the circuit shown in FIG. 1.

FIG. 1 shows a circuit combining the functions of shading correction and gamma correction of video signals derived from a television camera pickup tube. A source of video signals 11 is coupled to an input terminal 12 of the gamma and shading correction circuit. It is understood that the video signals have been clamped and clipped at a nominal black level. From terminal 12 the video signals are coupled through a resistor 13 to the base of a transistor 14 connected in an emitter-follower configuration. Resistors 15 and 16 provide a biasing network for the base of transistor 14, resistor 15 being coupled to a source of positive voltage and resistor 16 being coupled to ground. The emitter electrode of transistor 14 is coupled through a resistor 18 to a source of negative voltage.

The video signals appearing at terminal 12 are also coupled to a nonlinear attenuating network through a resistor 20. A diode 21 is coupled between resistor 20 and the junction of resistors 24 and 25, the other ends of resistors 24 and 25 being coupled respectively to a terminal 40 and ground. A diode 22 is coupled between resistor 20 and the junction of resistors 26 and 27, the other ends of resistors 26 and 27 being coupled respectively to terminal 40 and ground. A diode 23 is coupled between resistor 20 and the junction of resistors 28 and 29, the other ends of resistors 28 and 29 being coupled respectively to terminal 40 and ground. A resistor 30 is coupled between the cathode of diode 21 and a source of positive potential, and a resistor 31 is coupled between the cathode of diode 22 and a source of positive potential.

The junction of the anodes of diodes 21, 22 and 23 and resistor 20 is coupled to the base electrode of a transistor 60. The collector electrode of transistor 60 is coupled to a source of positive potential and the emitter electrode of transistor 60 is coupled through a resistor 62 to a source of negative potential. Potentiometer 64 is coupled between the emitter electrodes of transistors 14 and 60. The wiper arm of potentiometer 64 is coupled to an output terminal 65.

A feedback amplifier comprising transistors 33, 34, and 35 is coupled between a matrixing network and the nonlinear attenuating network. Transistors 33 and 34 comprise a differential amplifier. The base electrode of transistor 34 is connected to ground. The collector electrode of transistor 34 is connected to a source of positive potential and the emitter electrode of transistor 34 is coupled to the emitter electrode of transistor 33; the two emitter electrodes being coupled through a resistor 37 to a source of negative potential. The base of transistor 33 is coupled through a resistor 38 to a source of negative potential, while the collector electrode of transistor 33 is coupled through a resistor 36 to a source of positive potential. The collector electrode of transistor 33 is also coupled to the base electrode of transistor 35. The electrode of transistor 35 is connected to a source of positive potential and the emitter electrode is coupled to terminal 40, and through a feedback resistor 39 to the base electrode of transistor 33. Terminal 40 is connected to the junction of resistors 24, 26 and 28.

A shading waveform generator 57 of any suitable type supplies sawtooth and parabolic waveforms at horizontal and vertical scanning rates to potentiometers 41, 42, 43, and 44 as indicated. The adjustment of the wiper arms of the respective potentiometers may be adjusted such that sawtooth and parabolic waveforms of the desired amplitude and polarity are coupled through matrixing network resistors 45, 46, 47 and 48 to a capacitor 49. A composite shading correction waveform obtained from the output of the matrix is coupled through capacitor 49 to the base electrode of transistor 33 of the differential amplifier 32.

In operation, the video signals 11 which have been suitably clamped and clipped at the black level are applied to input terminal 12 and are attenuated by resistor 13 before being applied to the base of transistor 14. Biasing resistors 15 and 16 are selected such that transistor 14 is biased at the black level of the attenuated video signal 17. Transistor 14 is connected as an emitter-follower whereby the waveform 19 appearing at the emitter electrode is substantially the same as the input video waveform 17. Video signals 11 appearing at terminal 12 also are applied to a nonlinear attenuating network including diodes 21, 22, 23 and resistors 24 through 31. The cathode of diode 21 is biased by resistors 24, 25, and 30. The cathode of diode 22 is biased by resistors 26, 27 and 31. Diode 23 is biased by resistors 28 and 29. A common biasing potential, developed by transistor 35 in a manner to be described subsequently, is applied to terminal 40. The values of biasing resistors 24 through 31 are selected such that diodes 21, 22 and 23 conduct at successively higher levels of the video input waveforms, such that the network provides greater attenuation of the higher level input waveforms.

Referring to FIG. 2, curve 51 represents the characteristic of the nonlinear network with a fixed biasing potential appearing at terminal 40. The break points 52, 53 and 54 on curve 51 represent the conductive points of diodes 21, 22, and 23, respectively. Referring again to FIG. 1, for a fixed biasing potential at terminal 40 waveform 11 is modified by the nonlinear attenuating network so as to produce the waveform 61 at the base electrode of transistor 60. Transistor 60 is connected in an emitter-follower configuration and the waveform 63 appearing at the emitter electrode is substantially the same as video waveform 61. The base levels and the amplitude of video waveforms 19 and 63 are the same. Video waveform 63 has been gamma corrected by the nonlinear network such that the waveform 63 is related to waveform 11 by an exponential factor of about 0.4. A power law other than 0.4 may be impressed upon the video waveform by suitably selecting the values of biasing resistors 24 through 31 such that diodes 21, 22 and 23 successively conduct at the desired voltages.

Shading modulation correction is accomplished by superimposing a composite shading correction waveform on the biasing potential appearing at terminal 40. The feedback amplifier comprising transistors 33, 34 and 35 produces, in the absence of a correction waveform at the base of transistor 33, a fixed biasing potential at terminal 40. In this condition a constant output voltage derived at the collector of transistor 33 is applied to the base of transistor 35 and a corresponding fixed voltage appears at the emitter of transistor 35 and at terminal 40. Resistor 39 couples a portion of this fixed bias voltage back to the base of transistor 33, providing feedback which insures a constant bias potential at terminal 40.

A composite shading correction waveform is coupled to the base of transistor 33 such that the bias potential at terminal 40 will be altered according to the applied waveform. A suitable shading waveform generator 57 supplies sawtooth and parabolic waveforms at the vertical and horizontal scanning rates to potentiometers 41, 42, 43 and 44. The wiper arms of these potentiometers are adjusted such that shading correction waveforms of the proper amplitude and polarity are applied to matrixing resistors 45, 46, 47 and 48. The correction waveforms are combined in the matrixing network which produces a composite shading correction waveform which is coupled through capacitor 49 to the base of transistor 33 to dynamically vary the bias potential at terminal 40.

Referring to FIG. 2, curve 51*a* represents the characteristic of the nonlinear attenuating network when a composite shading correction waveform has been superimposed on the bias potential at terminal 40. For purposes of illustration, curve 51*a* reflects the addition of a single horizontal sawtooth correction waveform to the fixed biasing potential. However, it is to be understood that the composite shading correction waveform coupled to the base of transistor 33, and combined with the biasing potential at terminal 40, may be any combination of the waveforms derived from the wiper arms of potentiometers 41, 42, 43 and 44. FIG. 2 illustrates the effect of the nonlinear network on a video waveform 55. Waveform 55 is representative of the video waveform 11 applied to terminal 12. Waveform 56 of FIG. 2 is similar to the waveform 63 appearing at the emitter of transistor 60 when only a steady state bias is applied to terminal 40. By comparing video waveforms 55 and 56 it can be seen that the characteristic curve 51 of the attenuating network has modified the input waveform 55 such that the higher voltage levels of waveform 55 are attenuated more than the lower voltage levels. This characteristic provides gamma correction of the video waveform.

Waveform 56*a* of FIG. 2 represents the waveform 63 appearing at the emitter of transistor 60 when a sawtooth shading correction waveform at the same rate as the video waveform is applied to the feedback amplifier 32.

Curve 51*a* represents the altered characteristics of the nonlinear attenuating network when the above described shading modulation waveform is superimposed on the fixed potential at terminal 40. Waveform 56*a*, therefore, has been modified by the characteristics represented by the curve 51*a*. Thus, the shading modulation correction has been combined with the nonlinear gamma correction such that the video waveform 63 has been both shading corrected and gamma corrected.

The shading and gamma corrected video waveform 63 and the linear video waveform 19 are both applied to potentiometer 64 in such a manner that by proper adjustment of the wiper arm of potentiometer 64 video waveforms 66 appearing at output terminal 65 may have a shading and gamma correction of any power law between the 0.4 power law of the nonlinear network and the unity power law of the linear video waveform 19 appearing at the emitter of transistor 14. The circuit described may be used to provide shading modulation correction and gamma correction to any video waveform. In a typical color television camera in which separate red, green and blue video signals are derived from three image pickup tubes the described circuit may be used in all three video channels with proper adjustment of the shading and gamma controls for each channel.

By combining the functions of shading modulation and gamma correction as described above, the need for a separate gain modulator to which the shading correction waveforms and video waveforms are applied as in prior arrangements is eliminated. Also, the feedback amplifier, having a low impedance input at the base of the transistor 33, allows matrixing of the individual shading correction waveforms at this point in the circuit, thereby eliminating the necessity for a matrixing stage in the shading generator.

Transistors 14, 33, 34, 35 and 60 are preferably all contained in an integrated circuit so that all are subjected to the same environment, thereby increasing the stability of the circuit over arrangements utilizing separately encased transistors. Such an integrated circuit suitable for use in the circuit described is an RCA Type CA3045 linear integrated circuit, for example.

Figures 3, 4:
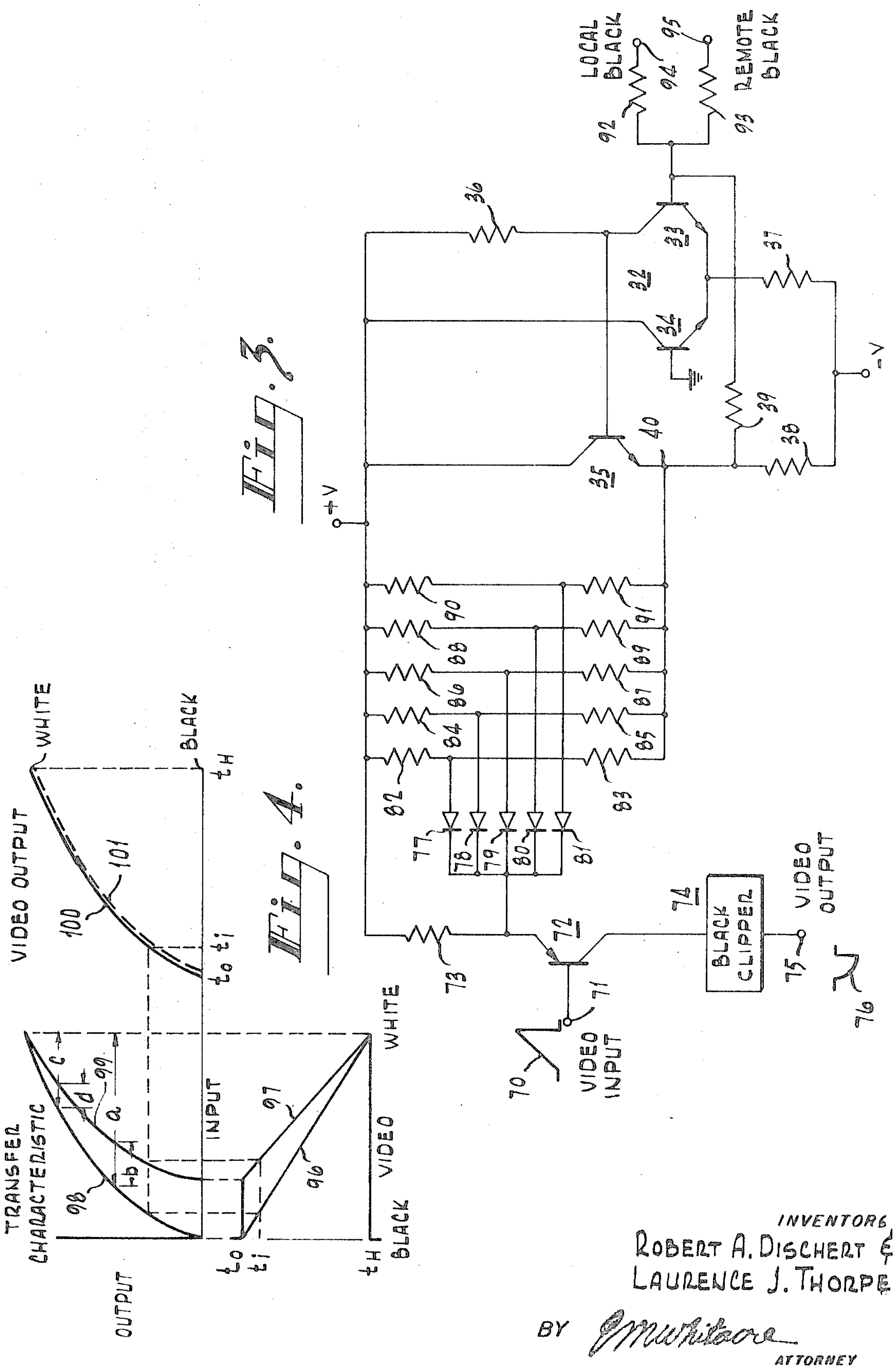
FIG. 3 is a schematic diagram of another embodiment of the invention combining the functions of gamma correction and pedestal height control.
FIG. 4 illustrates typical characteristic curves and waveforms of the circuit shown in FIG. 3.

FIG. 3 is a schematic diagram of another embodiment of the invention for combining functions of gamma correction and pedestal height control. The circuit elements performing the same function as the corresponding elements in FIG. 1 are indicated by the same reference characters.

A source of clamped video signals 70 applied to an input terminal 71 are coupled to the base electrode of a transistor 72. The collector electrode of transistor 72 is coupled to a black clipper 74. The output of clipping circuit 74 is coupled to an output terminal 75. The emitter electrode of transistor 72 is coupled through a resistor 73 to a source of positive voltage. In parallel with resistor 73 is a nonlinear network including diodes 77—81, having their cathodes connected to the emitter of transistor 72 and their anodes connected to the junctions of biasing resistors 82 and 83, 84 and 85, 86 and 87, 88 and 89, and 90 and 91, respectively. The other ends of resistors 82, 84, 86, 88 and 90 are connected to a source of positive voltage. The other ends of resistors 83, 85, 87, 89 and 91 are connected to the emitter electrode of transistor 35.

Transistors Transistor 33 and 34, connected as a differential amplifier 32, and transistor 35, are connected as a feedback amplifier, the operation of which is as previously described in conjunction with FIG. 1.

The base electrode of transistor 33 is coupled through a resistor 92 to a terminal 94 and also through a resistor 93 to a terminal 95. DC black level control voltages are coupled to terminals 94 and 95 from local and remote control circuits which may comprise potentiometers connected to DC voltage sources. The low impedance input circuit of the differential amplifier 32 allows the various black level control voltages to be matrixed conveniently at this point.

During operation, video waveform 70, in which the portion occurring during the blanking interval has been clamped at a reference level (e.g., +2 volts), is applied to the base electrode of transistor 72. Corresponding signals will be developed in the emitter circuit across resistor 73 and the nonlinear network comprising diodes 77—81. The diodes 77–81 are biased by resistors 82—91 connected between a source of positive voltage (e.g., +10 volts) and junction 40. When the black level control inputs provided at terminals 94 and 95 are adjusted such that the voltage at junction 40 is at a minimum value (e.g., zero volts), all of the diodes 77—81 are conductive for video input signal levels (waveform 70) at or above the reference blanking level (+2 volts). As the video input signal 70 increases (i.e., becomes more positive), the diodes 77—81 sequentially cease conducting as their respective bias voltages are exceeded. AS the diodes 77—81 cease conducting, their associated bias resistors are disconnected from across resistor 73, the impedance in the emitter circuit of transistor 72 increases, the gain decreases and the collector current of transistor 72 decreases nonlinearly up to the peak white level of video signal 70.

Referring to FIG. 4, waveform 96 is representative of a typical video waveform having no pedestal component which is applied to the base of transistor 72. Curve 98 is a typical transfer characteristic of the nonlinear network including diodes 77—81 when the junction 40 is at a nominal zero volts. Waveform 100 in FIG. 4, represented by a solid curve, is typical of the gamma corrected output video waveform derived from the clipper 74 in the collector circuit of transistor 72. Waveform 100 illustrates the effect on the linearly increasing video signals of the nonlinear network. The video waveform 76 at output terminal 75 is inverted from this because of inversion of the video signals from the base to collector electrodes of transistor 72.

In order to maintain the pedestal component of the video signals at a desired level, either the video signals or the image produced from such signals on a television monitor may be observed and compared to a reference. When the input video signals supplied to the base electrode of transistor 72 include an undesired pedestal component the black level control voltage applied to the base electrode of transistor 33 is increased negatively and the voltage at junction 40 therefore increases positively. This increased positive voltage produces a shift in the voltages at which each of diodes 77—81 cease conducting (i.e., the cutoff voltages are shifted in a positive direction). Furthermore, the maximum emitter current (and collector current) supplied to transistor 72 from the voltage supply (+V) via the parallel paths comprising resistor 73 and the diodes 77—81 (which current is supplied during the minimum voltage portion of the applied input waveform) will be increased as compared to the maximum emitter (and collector)

current produced in the case described above (i.e., with zero volts at junction 40). Black clipper 74 is arranged to clip or remove that magnitude of collector current which exceeds the current produced with zero voltage at junction 40 and nominal black level input voltage supplied to the base electrode of transistor 72. With an input video waveform of the type illustrated by waveform 97 (FIG. 4), the transfer characteristic between input terminal 71 and output terminal 75 will be modified as illustrated by characteristic 99. The resulting output waveform is illustrated by dotted waveform 101 which substantially coincides with waveform 100 described above. The pedestal component of the input waveform 97 does not appear in the output waveform 101.

The resistors 82—91 are selected to maintain the proportionality $b/a = d/c$ between the characteristic curves 98 and 99. All of the diodes 77—81 are arranged to be cut off prior to peak white levels under all conditions, thus, the peak white level in the collector circuit does not change. Thus, the pedestal, or black level, of the video signals may be altered without altering the peak white level or gamma characteristic imparted to the signals by the nonlinear network, the gamma correction being determined by selection of the values of resistors 82—91.

Each of the circuits shown in FIGS. 1 and 3 may be used independently in a television camera to provide shading and gamma correction while maintaining the black level constant, and to provide gamma correction and pedestal height control while maintaining the white level constant, respectively. If desired, the two circuits may be used together to provide apparatus for gamma correction, shading correction and black and white level control, thereby greatly reducing the circuit complexity over previous arrangements. For combined operation output terminal 65 of FIG. 1 may be coupled to input terminal 71 of FIG. 3 since the output signals appearing at terminal 65 are clamped at a black level. The gamma correction will be the products of the correction supplied by the two nonlinear circuits, so if an overall gamma power law of 0.5 is desired, for example, the power law of each of the nonlinear circuits may be selected to be about 0.7.

We claim:

1. In a television camera, apparatus for providing shading modulation correction and gamma correction of video signals, comprising:
- a source of video signals;
- a nonlinear attentuating network including a plurality of conducting devices;
- means coupling said video signals to said nonlinear network;
- biasing means having an output coupled to said nonlinear network for determining conduction of said devices;
- means for producing shading modulation correction waveforms coupled to said biasing means for superimposing on said output a composite waveform recurring in synchronism with line and field scanning in said camera; whereby
- to alter said conduction characteristics such that said nonlinear network provides shading modulation correction and gamma correction of said video signals applied thereto.

2. Shading modulation and gamma correction apparatus according to claim 1 wherein said biasing means causes successive ones of said conducting devices to conduct at successively higher voltage levels of said video signals coupled to said nonlinear network.

3. Shading modulation and gamma correction apparatus according to claim 2 wherein said conducting devices are diodes.

4. Shading modulation and gamma correction apparatus according to claim 3 wherein said means for producing shading modulation correction waveforms includes means for producing sawtooth and parabolic waveforms at the line and field scanning rates of said camera.

5. Shading modulation and gamma correction apparatus according to claim 4 wherein said biasing means includes a feedback amplifier for providing a biasing potential for said diodes, a portion of which biasing potential is coupled to the input of said amplifier for providing feedback for said amplifier.

6. Shading modulation and gamma correction apparatus according to claim 5 wherein said feedback amplifier provides fixed biasing potentials for said diodes when no shading modulation correction waveforms are applied to said feedback amplifier.

7. Shading modulation and gamma correction apparatus according to claim 5 wherein said feedback amplifier provides varying biasing potentials for said diodes when said shading correction waveforms are applied to said feedback amplifier.

8. Shading modulation and gamma correction apparatus according to claim 7 wherein said nonlinear network has a power law characteristic determined by the biasing potentials applied to said diodes.

9. Shading modulation and gamma correction apparatus according to claim 8 wherein said means coupling said video signals to said nonlinear network includes a linear network having a power law of unity, the output terminal of which linear network is coupled through a potentiometer to the output terminal of said nonlinear network, the wiper arm of said potentiometers being connected to an output terminal at which video signals are derived having a power law correction factor between said power law of said nonlinear network and unity, said factor being determined by the adjustment of said potentiometer.

10. In a television camera, apparatus for processing video signals, comprising:
- a source of video signals;
- nonlinear network means including a plurality of conducting devices for imparting a nonlinear gamma correction characteristic to signals applied thereto;
- means coupling said video signals to said nonlinear network; and
- means including a source providing shading modulation correction waveforms recurring in synchronism with line and field scanning in said camera coupled to said nonlinear network for altering conduction of said devices such that said video signals obtained from said nonlinear network are further altered in accordance with said shading modulation correction waveforms substantially without modification of said gamma correction characteristic.

11. In a television camera, apparatus for processing video signals, comprising:
- a source of video signals;
- nonlinear network means including a plurality of conducting devices for imparting a nonlinear gamma correction characteristic to signals applied thereto;
- means coupling said video signals to said nonlinear network; and
- means including a source providing variable black level control signals coupled to said nonlinear network for altering conduction of said devices such that said video signals obtained from said nonlinear network are further altered in accordance with said black level control signals substantially without modification of said gamma correction characteristic.

12. In a television camera, apparatus for providing gamma correction and pedestal height control of video signals comprising:
- an amplifier having input and output circuits;
- a source of video signals coupled to said amplifier input circuit;
- nonlinear network means coupled to said amplifier input circuit and including a plurality of controllable conducting devices for imparting a nonlinear gamma correction characteristic to said video signals;
- a source of pedestal height control voltage;
- pedestal height control means coupled to said control voltage source and to said nonlinear network means for altering conduction of said devices; and signal clipping means coupled to said amplifier output circuit for maintaining image black representative components at a reference level.

13. Apparatus according to claim 12 wherein said conducting devices comprise a plurality of diodes biased to successively cease conduction in response to increases in the amplitude of said video signals.

14. Apparatus according to claim 13 wherein said pedestal height control means includes a feedback amplifier for providing a biasing voltage to said diodes in response to said pedestal height control voltage.

15. Apparatus according ro claim 14 wherein said amplifier comprises a transistor having a resistor coupled in said input circuit, said nonlinear network being coupled across said resistor for varying the gain of said amplifier.

16. Apparatus according to claim 15 wherein said diodes normally are fully conducting for video signals at the black level and are nonconducting for video signals at the peak white level.

17. Apparatus according to claim 16 wherein said biasing voltage determines the signal level at which said diodes are fully conducting.

18. In a television camera, apparatus for providing gamma correction, shading modulation correction and pedestal height control of video signals comprising:

a source of video signals;

a first nonlinear network including a plurality of conducting devices for providing gamma correction of signals applied thereto;

means coupling said video signals to said first nonlinear network;

a source of shading correction waveforms;

means coupling said shading correction waveforms to said first nonlinear network for altering the characteristics thereof so that said video signals obtained from said first nonlinear network are altered according to said altered characteristics;

a second nonlinear network including a plurality of conducting devices for providing gamma correction to signals applied thereto;

means coupling said video signals obtained from said first nonlinear network to said second nonlinear network;

a source of pedestal height control signals; and means responsive to said pedestal height control signals coupled to said second nonlinear network for altering its characteristics such that said video signals obtained from said second nonlinear network are altered according to said last mentioned characteristics and such that the gamma correction of said video signals obtained from said second nonlinear network is substantially equal to the product of said gamma corrections provided by said first and second nonlinear networks.